United States Patent [19]

Comfort et al.

[11] 4,376,975

[45] * Mar. 15, 1983

[54] ARBITRATION CONTROLLER PROVIDING FOR ACCESS OF A COMMON RESOURCE BY A PLURALITY OF CENTRAL PROCESSING UNITS

[75] Inventors: Joseph A. Comfort; Thomas J. Perry; Michel Loos, all of Phoenix, Ariz.

[73] Assignee: GTE Automatic Electric Labs Inc., Northlake, Ill.

[*] Notice: The portion of the term of this patent subsequent to Dec. 7, 1999, has been disclaimed.

[21] Appl. No.: 163,049

[22] Filed: Jun. 26, 1980

[51] Int. Cl.³ .................... G06F 13/00; G06F 15/16
[52] U.S. Cl. .................................................. 364/200
[58] Field of Search ... 364/200 MS File, 900 MS File, 364/187; 371/9

[56] References Cited

U.S. PATENT DOCUMENTS

| | | | |
|---|---|---|---|
| 3,505,651 | 4/1970 | Barlow et al. | 364/200 |
| 3,521,238 | 7/1970 | Gunderson | 364/200 |
| 3,699,529 | 10/1972 | Beyers et al. | 364/200 |
| 3,806,885 | 4/1974 | Moore | 364/200 |
| 3,882,455 | 5/1975 | Heck et al. | 371/9 |
| 4,034,347 | 7/1977 | Probert, Jr. | 364/200 |
| 4,096,571 | 6/1978 | Vander Mey | 364/200 |
| 4,159,518 | 6/1979 | Draper et al. | 364/200 |
| 4,164,787 | 8/1979 | Aranguren | 364/200 |
| 4,171,536 | 10/1979 | Heuer et al. | 364/200 |
| 4,191,996 | 3/1980 | Chesley | 371/9 |
| 4,228,496 | 10/1980 | Katzman et al. | 364/200 |

Primary Examiner—Mark E. Nusbaum
Assistant Examiner—William G. Niessen
Attorney, Agent, or Firm—Robert J. Black; Frank J. Bogacz

[57] ABSTRACT

An arbitration controller providing for equal priority sharing of a resource by a plurality of central processing units. Conflicts resulting from simultaneous requests from several CPUs for access to the common resource are resolved at a high rate of speed. In addition, an approximately statistically equal probability is maintained for access of the common resource by all the central processing units.

7 Claims, 2 Drawing Figures

ARBITRATION CONTROLLER PROVIDING FOR ACCESS OF A COMMON RESOURCE BY A PLURALITY OF CENTRAL PROCESSING UNITS

CROSS-REFERENCES TO RELATED APPLICATIONS

The present application is related to co-pending U.S. applications Ser. Nos.: 163,044; 163,045; 163,046; 163,048; and 163,047, all assigned to the same assignee.

BACKGROUND OF THE INVENTION (1) Field of the Invention

The present invention pertains to multicentral processing unit controlled real time systems and more particularly to an arbitration scheme for resolving conflicting requests from the central processing units for access to a commonly shared resource.

(2) Description of the Prior Art

Computer control has been applied to a vast number of real time process control systems. For example, central processing units (CPUs) control the real time switching operation in modern telephone central offices. Historically, large CPUs have been developed to provide the control function for large telephone central offices.

In more recent times, large central processing units have given way to distributed processing schemes. In such schemes, numbers of smaller central processing units act together to perform the control functions, thereby increasing the overall flexibility of such a system and providing for modular expansion. In the telephone central office example, many smaller central processor units working together can handle telephone traffic more efficiently and economically than a single large central processing unit. Microprocessor CPUs are specially suited to such an operation.

In distributed processing systems where there are a number of central processing units, CPUs may typically exchange information in order to perform one overall task. One solution to the information exchange problem is to have two CPUs talk directly to one another. In such a configuration, each CPU must stop any other tasks which it may be performing establish a direct link via a defined protocol scheme and then transmit the required information.

In another solution, the CPUs may asynchronously place information in a predefined resource, so that the CPU which is to receive the information may remove it at its own particular available time. In sharing a common resource, a problem of allocation of the resource to a particular CPU arises. That is, a number of CPUs may request to deposit or retrieve information simultaneously. Therefore, conflicts in accessing the resource arise and these conflicts of access must be resolved. Previous access schemes involved scanning signals for request or allocating certain time slots in which each processor may access the resource. Such systems are time consuming and inefficient and further they allow monopolization of the resource by a particular CPU of the group.

Accordingly, it is an object of the present invention to provide an arbitration controller for providing equal priority sharing of a common resource by a plurality of CPUs.

It is a further important objective of the present invention to provide such a controller which prohibits monopolization of the common resource by a particular CPU.

It is another important objective of the present invention to provide for the arbitration of simultaneous access by CPUs at a very rapid rate in order to allow an efficient information exchange.

It is another important objective of the present invention to provide for an approximately statistically equal probability of each CPU for obtaining access to the resource.

It is another important objective of the present invention to provide an arbitration controller which may grow in the number of CPUs, which are subject to control, in an efficient and economical manner.

SUMMARY OF THE INVENTION

The present invention comprises an arbitration controller providing for equal priority sharing of a common resource by a plurality of CPUs. These CPUs communicate with one another by transmitting information asynchronously to the common resource and retrieving information deposited therein by the other CPUs. One resource can operate with only one CPU at one time. Therefore, each CPU is connected to a corresponding arbitration circuit and the connections between each CPU and its corresponding arbitration circuit each comprise a tri-state bus arrangement. Each arbitration circuit is connected to the resource via a common tri-state bus.

In addition, each arbitration circuit is connected to the next successive arbitration circuit, with the last arbitration circuit being connected to the first, thereby forming a ring connection. An initialization signal is applied to the first arbitration circuit and a bus available signal is derived from it and is propagated along the ring connection in a circular of fashion. When a CPU requests an access to the common resource, a signal is transmitted via the tri-state bus between the CPU and the arbitration circuit. Since the bus available signal moves along the completed ring connection at a high rate of speed, in a very short time the bus available signal will enter the logic of the arbitration circuit corresponding to the CPU which has made the common resource request. The signals are analyzed by the arbitration circuit and the requesting CPU is given access to the common tri-state bus connected to the common resource. The CPU then proceeds with the information exchange and other CPUs must wait.

When two or more CPUs simultaneously request access to the common resource, the next CPU which has an active common resource request and sequentially obtains the bus available signal will gain control of the common resource. The bus available signal travels at a high rate of speed slowed only by a single gate propagation time, if no requests for the common resource are active. The probability of any CPU gaining access to the common resource is statistically equal to that of any other CPU. Each CPU is allowed only one access cycle to the common resource and then must relinquish control of the resource. In this way, one CPU is prohibited from monopolizing the resource for a long period of time.

After the completion of one access cycle to the common resource, other CPUs will sequentially be granted the access to the resource. If other CPUs have active requests, they will be serviced in a sequential fashion similar to that as described above.

While one CPU is accessing the resource, and if no other CPUs had active common bus request signals, the bus available signal will propagate along the ring connection and back to the CPU which is currently accessing the resource. The propagation of the bus available signal will not be halted, because other common bus request signals may have become active in the intervening propagation time. Therefore, the arbitration circuit will re-propagate the bus available signal, so that the next active common bus request can be established simultaneously with the processing of the current resource access. In addition, this scheme of re-propagating the bus available signal prevents a particular CPU from making two consecutive resource accesses.

If the bus available signal returns to the arbitration circuit making a resource access, a take grant signal is generated to automatically allow the next sequential arbitration circuit to access the resource if it has an active request. This take grant signal is important when no other CPUs have an active request because it prevents one arbitration circuit from multiple consecutive accesses and distributes determination of which is the next available resource request to be given access on a rotational basis. This scheme keeps resource access equal when CPU requests are few and sporadic.

Optionally, each arbitration circuit provides its associated CPU with the ability to hold the access of the resource for more than one cycle.

DESCRIPTION OF THE PREFERRED EMBODIMENT

Figure 1:
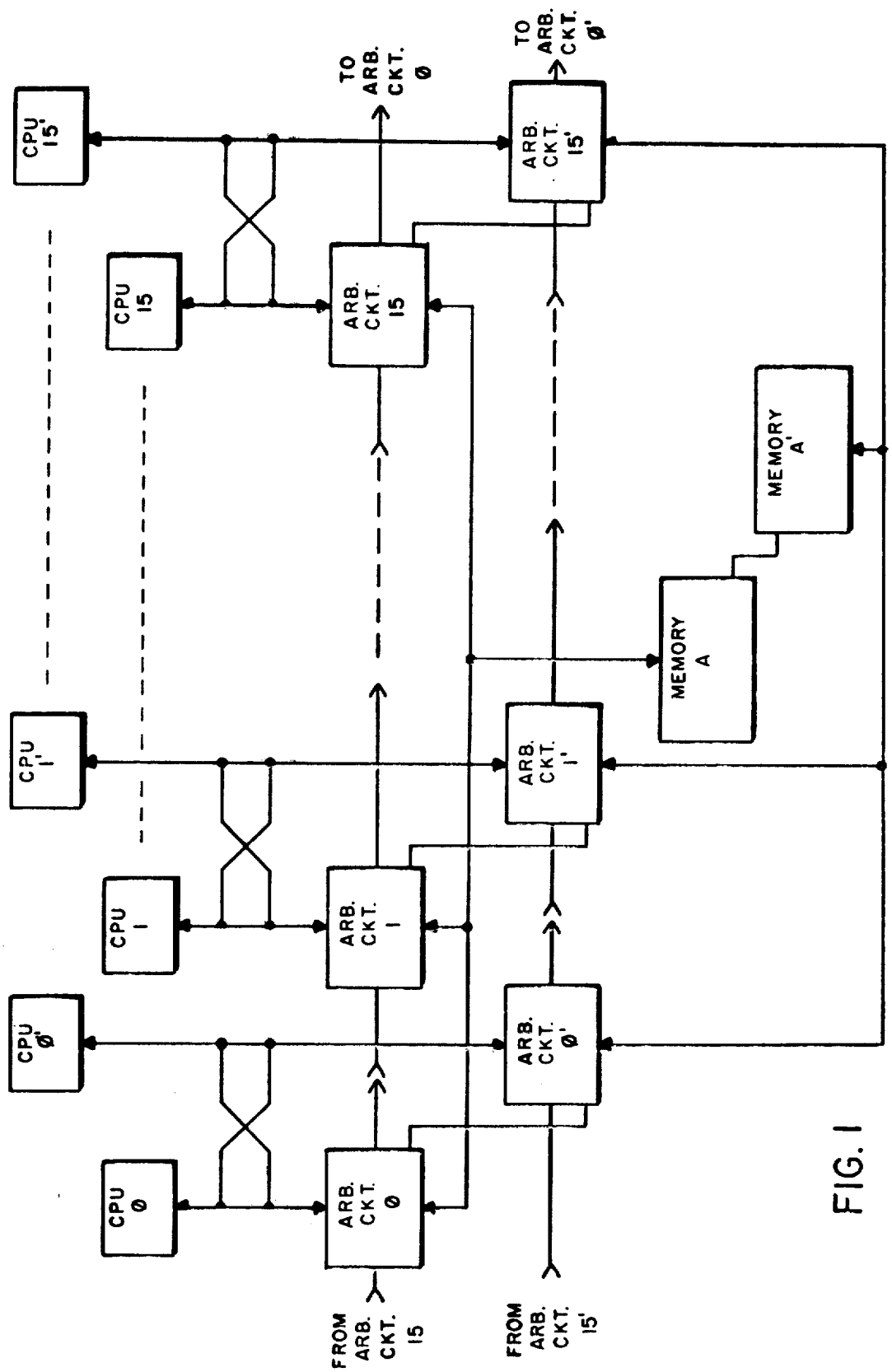
FIG. 1 is a block diagram of an arbitration controller providing equal priority sharing of a common resource by a plurality of CPUs.

Referring to FIG. 1, an arbitration controller apparatus is shown, such apparatus being shown in a duplex form. The present application teaches simplex arbitration control only as shown by all the unprimed block symbols. Duplex arbitration control is taught in co-pending sister application Ser. No. 163,044. Therefore, this application will deal only with the unprimed block symbol shown in FIG. 1.

Each central processing unit (CPU) 0-15 is shown connected via a tri-state bus to a corresponding arbitration circuit 0-15. Each arbitration circuit 0-15 is in turn connected via a common tri-state bus to memory unit A. Arbitration circuit 0 is connected to arbitration circuit 1 with arbitration circuit 1 being connected to the next successive arbitration circuit and the last arbitration circuit connected back again to arbitration circuit 0, thereby forming a completed ring connection. The number of arbitration circuits is in direct relation to the number of CPUs in the configuration.

The configuration may contain as many as 16 central processing units (each may comprise an INTEL 8086 or similar device) and therefore, 16 arbitration circuits. The number of CPUs is expandable from 1 to a total of 16 in this implementation. As a practical matter, at least two CPUs are required for the function of telephone central office switching. It should be noted that if the configuration contained only one CPU there would be no need for arbitration circuits since memory A would be accessible on a full time basis to CPU 0.

When an initialization signal is applied to arbitration circuit 0, a bus available signal is derived and propagated along to each successive arbitration circuit ultimately returning to arbitration circuit 0 where it is again propagated. When for example, CPU 0 requests access to memory A, arbitration circuit 0 receives a request signal via its bus. And as the bus available signal is propagating through the logic of arbitration circuit 0, arbitration circuit 0 will temporarily block the propagation of the bus available signal. As a result, CPU 0 will have control of the common bus between the arbitration circuits and can access memory A. CPU 0 then performs a memory access of a duration of one memory cycle while simultaneously re-propagating the bus available signal to the next sequential arbitration circuit 1.

The bus available signal travels along the ring connection of arbitration circuits 0-15 at a relatively high rate of speed, so that the probability of each CPU gaining access to memory A is relatively equal among the CPUs. Each arbitration circuit slows the propagation of the bus available signal only by the time required to propagate this signal through a high speed gating arrangement.

When two or more CPUs simultaneously request access to memory A, a conflict situation arises. This conflict is arbitrated by means of the ring connection of arbitration circuits. The bus available signal propagates to the next sequential arbitration circuit. If that arbitration circuit has an active request for access to the common bus of memory A, the CPU associated with this arbitration circuit is then given control of the bus enabling the memory transfer to occur.

During this time, the bus available signal is re-propagated to the next succeeding arbitration circuit so that the second CPU may simultaneously establish itself as the next CPU to obtain the resource via the common bus. This arbitration occurs sequentially as described above until all outstanding requests for access to memory A have been serviced.

While a particular CPU has been granted access to memory A, the bus available signal will be re-propagated by its corresponding arbitration circuit. Other active CPUs will have the opportunity to establish a priority for service before a memory request will be granted to the same CPU. If the bus available signal returns to the arbitration circuit presently in control of the memory, a grant signal will automatically pass control of the grant of access to the next sequential arbitration circuit. Thereby, a particular CPU does not utilize its arbitration circuit to monopolize access to memory A.

However, optionally a CPU may lockout other CPUs for more than one memory cycle. Such conditions are limited and closely monitored.

Figure 2:
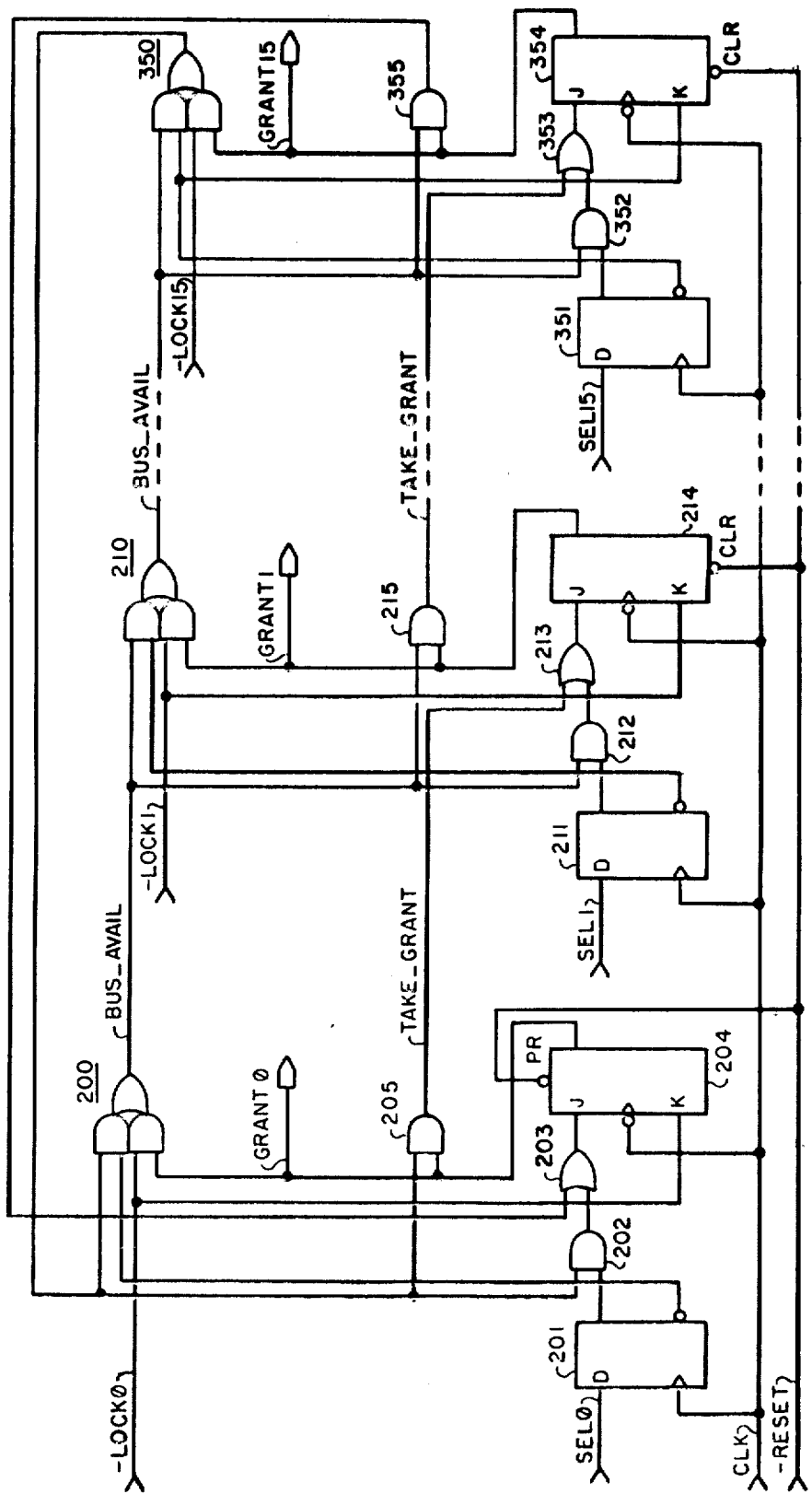
FIG. 2 is a schematic diagram of an arbitration circuit embodying the principles of operation of the present invention.

Referring now to FIG. 2, a schematic diagram of three arbitration circuits is shown. These circuits correspond to a first, a second and a last arbitration circuits. A particular implementation may include up to 16 arbitration circuits, one for each CPU equipped in the configuration.

Each arbitration circuit includes a gating arrangement composed of an AND-OR gate 200, which may be implemented via an integrated circuit part number 74S51 or similar device. A ring connection of gates 200, 210, etc. propagates the bus-avail signal from one arbitration circuit to the next at a relatively high rate of speed so that the signal is not inhibited by any single arbitration circuit for a substantial period of time.

D-Type flip-flop 201, 211 and 351 are each connected between a respective CPU and its respective arbitration logic. Gates 201, etc. may be implemented via integrated circuit part number 74S74. JK flip-flop 204, 214, etc. are each connected between their corresponding D-type flip-flops 201, 211, etc. and their corresponding AND-OR gate 200, 210, etc.

As a portion of the system clear and initialization, CPU 0 pulses the reset lead which is connected to JK flip-flops 204, 214, etc. As a result the bus-avail signal is generated through AND-OR gate 200 and propagates along the ring connection to AND-OR gate 210, 350 and back again to gate 200. A clock signal, taken from the memory clock of 8 MHZ, is transmitted to all flip-flops (D-type and JK) via the CLK lead to operate each of these flip-flops.

An example will best serve to illustrate the granting of control of the common bus to a particular CPU. When CPU 0 signals via the reset lead, flip-flop 204 is preset enabling gate 200 to transmit the bus available signal via the bus-avail lead to each successive gate 210, etc. When CPU 0 requests access to the common memory, CPU 0 raises the SEL0 lead via the bus connected between CPU 0 and arbitration circuit 0. At the next clock cycle, the clock signal via the CLK lead is transmitted to flip-flop 201 which becomes set and the Q output of this flip-flop temporarily disables gate 200 from further passing the bus-avail signal. The Q output of flip-flop 201 is passed through gates 202 and 203 and sets flip-flop 204, which causes it to toggle and produce a signal on the grant 0 lead and simultaneously enables gate 205. The grant 0 lead is returned to CPU 0 and this signal also enables tri-state elements (not shown), gating CPU 0 bus onto the common bus of memory A. While this memory access takes place, the bus available signal is re-propagated via the output of JK flip-flop 204 through the lower portion of gate 200, so that the successive arbitration circuits may establish their respective priority for memory access.

If the bus available signal returns to arbitration circuit 0 via the bus-avail lead while the access is in progress, the grant signal is transmitted via the take-grant lead automatically to the next sequential arbitration circuit 1, so that if SEL 1 is set, CPU 1 access requests will be given the grant on the next clock cycle. This scheme distributes determination of which is the next available memory request to be given access on a rotational basis; and this scheme further keeps memory access equal when CPU access requests are sporadic. In this way, a CPU may not make successive memory requests.

CPU 0 may now completes its data transfer to memory A. If another arbitration circuit has established its priority, that arbitration circuit will receive control of the common bus next. In this way, while one CPU is accessing memory, the next CPU is establishing its priority for service.

All buses are bidirectional and each directional link includes tri-state bus drivers which may be implemented via integrated circuit part number 74LS245. All above mentioned integrated circuits are manufactured by Texas Instruments Incorporated and various other manufacturers.

The CPU having the memory access grant may signal via the lock lead (normally high) to halt the re-propagation of the bus available signal and thereby hold memory access for longer than one cycle. This optional use is a rare circumstance and is closely monitored by the CPUs.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An arbitration controller providing for equal priority sharing of a common resource by a plurality of CPUs, said arbitration controller comprising:
   means for initialization providing a first signal;
   a plurality of arbitration circuits including a first, at least one successive and a last arbitration circuit;
   said means for initialization connected to at least one of said arbitration circuits;
   a plurality of CPU buses, each connected between a particular CPU and a particular arbitration circuit on a one for one basis, each CPU bus including a control portion and an address/data portion;
   a common bus connected between each of said CPUs and said resource via said particular arbitration circuit for the transmission of information between said resource and any of said plurality of CPUs via said address/data portion of said CPU bus;
   bus means for connecting said common bus to each of said plurality of CPU buses in a tri-state fashion;
   a plurality of circuit connections including a circuit connection between each arbitration circuit and each successive arbitration circuit, said last arbitration circuit connected to said first arbitration circuit, thereby forming a completed ring connection for propagating said first signal from one arbitration circuit to another arbitration circuit in a circular fashion;
   each arbitration circuit connected to said control portion of said particular CPU bus and operated in response to said first signal and to a common bus request signal from its corresponding CPU to produce a second signal for allowing said corresponding one of said plurality of CPUs access to said resource via said common bus;
   each said arbitration circuit including:
      first gating means operated to propagate said first signal along said ring connection at a relatively high rate of speed;
      latching means operated in response to said common bus request signal of said corresponding CPU to produce said second signal for allowing said CPU to access said resource via said common and CPU buses;
      second gating means operated in response to said operated latching means and in response to said propagated first signal to propagate a third signal from each arbitration circuit to each successive arbitration circuit; and said first signal propagating through each of
said arbitration circuits in said ring connection to successively enable said CPU access to said resource via said common bus, while said third signal permitting said successive arbitration circuits to establish priority for subsequent access of said resource simultaneously with a present access of said resource.

2. An arbitration controller as claimed in claim 1, wherein: each of said arbitration circuits has its first and second gating means interconnected whereby each CPU is given an equal priority access to said resource by inhibiting said propagation of said first signal.

3. An arbitration controller as claimed in claim 2, wherein: each said gating means is further connected to said particular CPU whereby said CPU exclusively controls access to said resource.

4. An arbitration controller as claimed in claim 1, wherein: said latching means includes first and second flip-flops, said first flip-flop connected between said corresponding CPU and said second flip-flop, said second flip-flop connected to said first and said second gating means of said arbitration circuit, said first flip-flop operated in response to said bus request signal and said second flip-flop operated in response to said operation of said first flip-flop to produce said second and said third signals.

5. An arbitration controller as claimed in claim 4, wherein: each of said flip-flops of each arbitration circuit includes a clock connection adapted to drive each of said flip-flops.

6. An arbitration controller as claimed in claim 4, wherein: each of said second flip-flop of each said arbitration circuit includes a reset connection to initialize each said second flip-flop to a predetermined condition.

7. An arbitration controller as claimed in claim 1, wherein: each of said second gating means are interconnected in a completed ring connection for propagating said third signal from one arbitration circuit to another.

* * * * *